US012500154B2

(12) United States Patent
Takie (10) Patent No.: US 12,500,154 B2
(45) Date of Patent: Dec. 16, 2025

(54) IMAGE PICKUP UNIT AND ENDOSCOPE (71) Applicant: OLYMPUS MEDICAL SYSTEMS CORP., Tokyo (JP)

(72) Inventor: Shuichi Takie, Chofu (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 0 days.

(21) Appl. No.: 18/749,609

(22) Filed: Jun. 21, 2024

(65) Prior Publication Data

US 2025/0006605 A1     Jan. 2, 2025

Related U.S. Application Data

(60) Provisional application No. 63/524,368, filed on Jun. 30, 2023.

(51) Int. Cl.
*H01L 23/498* (2006.01)
*A61B 1/05* (2006.01)
*H04N 23/50* (2023.01)

(52) U.S. Cl.
CPC ........ *H01L 23/49811* (2013.01); *A61B 1/051* (2013.01); *H01L 23/49838* (2013.01); *H04N 23/555* (2023.01)

(58) Field of Classification Search
CPC ......... H01L 23/49811; H01L 23/49838; A61B 1/051; A61B 1/04; A61B 1/0051; A61B 1/0055; H04N 23/555; H04N 23/54
See application file for complete search history.

(56) References Cited

U.S. PATENT DOCUMENTS

| | | | | |
|---|---|---|---|---|
| 2018/0317756 A1* | 11/2018 | Unsai | ..................... | H04N 23/54 |
| 2019/0038117 A1* | 2/2019 | Motohara | ................ | A61B 1/04 |
| 2020/0273783 A1* | 8/2020 | Sankman | ................ | H01L 24/17 |
| 2022/0022733 A1* | 1/2022 | Horibe | ............... | A61B 1/00096 |
| 2024/0021503 A1* | 1/2024 | Otsubo | ............... | H01L 25/0652 |
| 2024/0321714 A1* | 9/2024 | Sekijima | ................ | H01L 24/81 |

FOREIGN PATENT DOCUMENTS

| | | |
|---|---|---|
| JP | 2017023234 A | 2/2017 |
| WO | 2022234627 A1 | 11/2022 |
| WO | 2022254573 A1 | 12/2022 |

* cited by examiner

*Primary Examiner* — Nasim N Nirjhar
(74) *Attorney, Agent, or Firm* — Scully, Scott, Murphy & Presser, P.C.

(57) ABSTRACT

An image pickup unit for use with an endoscope comprises: a first wiring board in which a first surface, a plurality of first pads are disposed on the first surface, and a plurality of second pads are disposed on the first surface; and a second wiring board in which a second surface comprises a first region and a second region spaced apart from the first region, a plurality of first lands are disposed on the first region, the plurality of first lands are solder-bonded to the plurality of first pads, and a plurality of second lands are disposed on the second region, the plurality of second lands are solder-bonded to the plurality of second pads, and a sum of areas of the plurality of first pads is substantially same as a sum of areas of the plurality of second pads.

19 Claims, 5 Drawing Sheets

FIG. 8 and a cable 50.

IMAGE PICKUP UNIT AND ENDOSCOPE

CROSS REFERENCE TO RELATED APPLICATION

This application is based on and claims priority under 35 U.S.C. § 119 to U.S. Provisional Application No. 63/524,368, filed Jun. 30, 2023, the entire contents of which are incorporated herein by reference.

BACKGROUND OF THE DISCLOSURE

1. Field of the Disclosure

The present disclosure relates to an image pickup unit in which a flat wiring board and a three-dimensional wiring board are solder-bonded, and an endoscope including the image pickup unit in which the flat wiring board and the three-dimensional wiring board are solder-bonded.

2. Description of the Related Art

Recently, to achieve size reduction and higher functionality of electronic devices, a three-dimensional circuit device, for example, a molded interconnect device (MID) has been adopted.

Japanese Patent Application Laid-Open Publication No. 2017-23234 discloses an image pickup unit for an endoscope, using a deformed circuit board that is a three-dimensional circuit device. The image pickup unit includes an imager, a flat wiring board on which electronic components such as a capacitor and an IC chip are mounted, and the deformed circuit board (three-dimensional wiring board).

SUMMARY OF THE DISCLOSURE

An image pickup unit for use with an endoscope of the present disclosure comprises: a first wiring board comprising a first surface, a plurality of first pads disposed on the first surface, and a plurality of second pads disposed on the first surface; and a second wiring board comprising a second surface comprising a first region and a second region spaced apart from the first region, a plurality of first lands disposed on the first region, the plurality of first lands solder-bonded to the plurality of first pads, and a plurality of second lands disposed on the second region, the plurality of second lands solder-bonded to the plurality of second pads, in which a sum of areas of the plurality of first pads is substantially same as a sum of areas of the plurality of second pads.

An endoscope of another embodiment of the present disclosure includes an image pickup unit in a distal end portion of an insertion portion, and the image pickup unit includes: a semiconductor package including an image sensor; a first wiring board comprising a front surface bonded to the semiconductor package, a first surface on a side opposite to the front surface, a plurality of first pads disposed on the first surface, and a plurality of second pads disposed on the first surface; and a second wiring board comprising a second surface comprising a first region and a second region spaced apart from the first region, a plurality of first lands disposed on the first region, the plurality of first lands solder-bonded to the plurality of first pads, and a plurality of second lands disposed on the second region, the plurality of second lands solder-bonded to the plurality of second pads, in which a sum of areas of the plurality of first pads is substantially same as a sum of areas of the plurality of second pads.

DETAILED DESCRIPTION OF THE PREFERRED EMBODIMENTS

First Embodiment

Hereinafter, an image pickup unit 1 of a first embodiment of the present disclosure will be described with reference to the drawings. Note that the drawings based on the embodiment are schematic illustrations. The relation between the thickness and the width of each portion, the ratio in thickness of each portion, and the like in the drawings differ from the actual relation, ratio, and the like. There are also some portions with different dimensional relations and ratios among the drawings. Illustration of and assignment of reference signs to some constituent elements are omitted.

As shown in FIG. 1 to FIG. 5, the image pickup unit 1 includes a semiconductor package 40, a flat wiring board (first wiring board) 10, a three-dimensional wiring board (second wiring board) 20, an electronic component 30, and a cable 50.

The description will occasionally be made using a three-axis orthogonal coordinate system having a direction of an optical axis O of the image pickup unit 1 as an X-axis. A direction in which an X-axis value increases (FIG. 1, left direction) is referred to as "front" or "distal end side." A direction in which the X-axis value decreases (FIG. 1, right direction) is referred to as "rear" or "proximal end side." A direction in which a Y-axis value increases is referred to as "up" and a direction in which the Y-axis value decreases is referred to as "down." A direction closer to the optical axis O is referred to as "inner side" and a direction farther from the optical axis O is referred to as "outer side."

Figure 1:
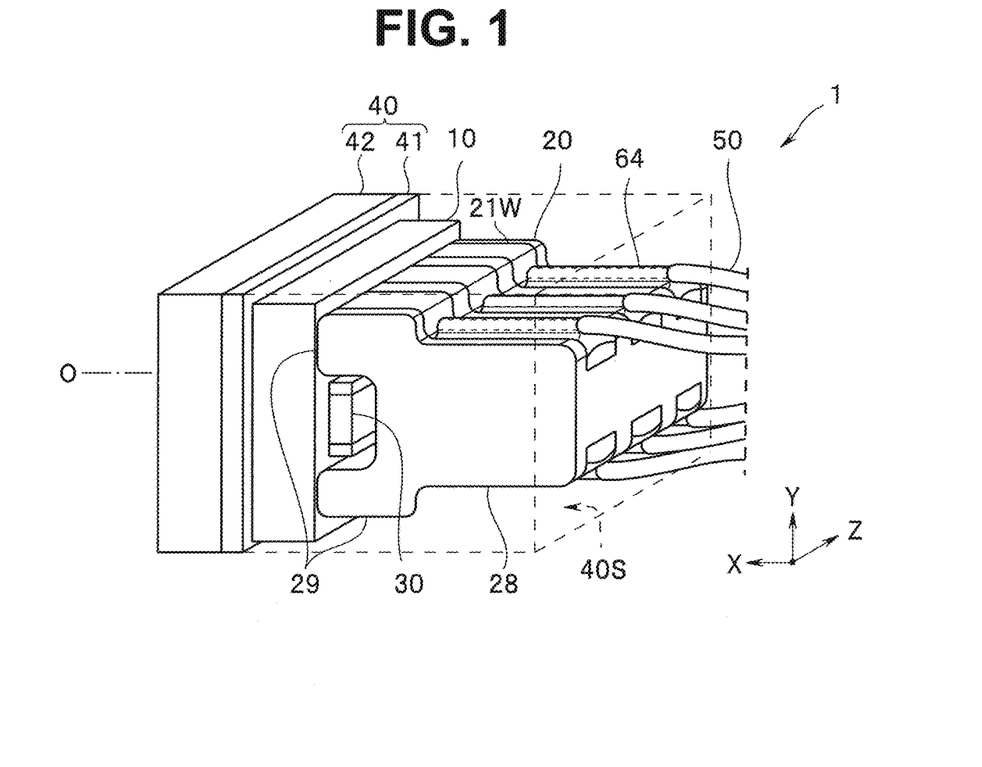
FIG. 1 is a perspective view of an image pickup unit of a first embodiment.
Figure 2:
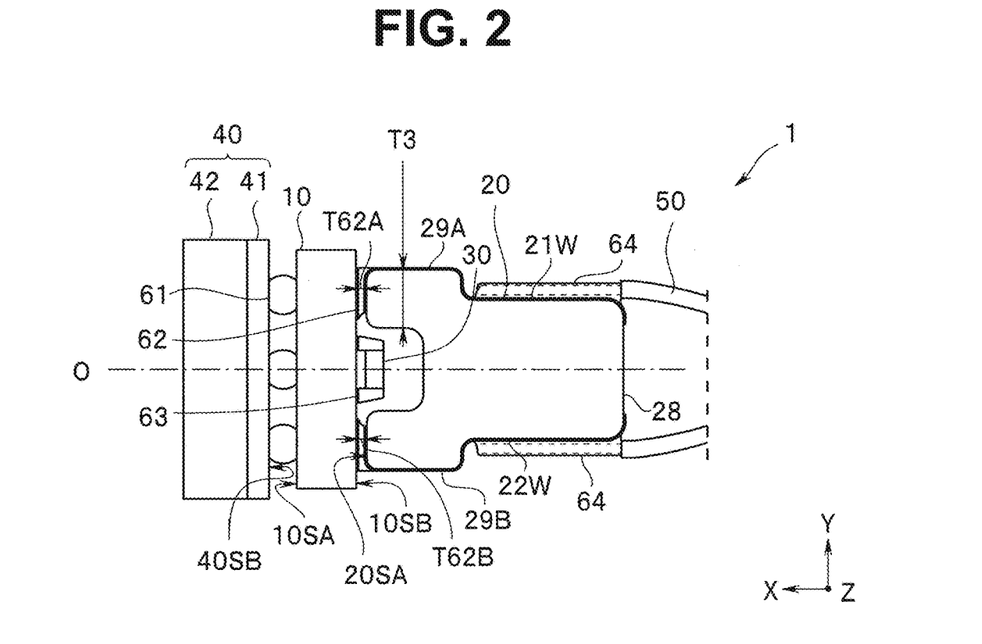
FIG. 2 is a side view of the image pickup unit of the first embodiment.
Figure 3:
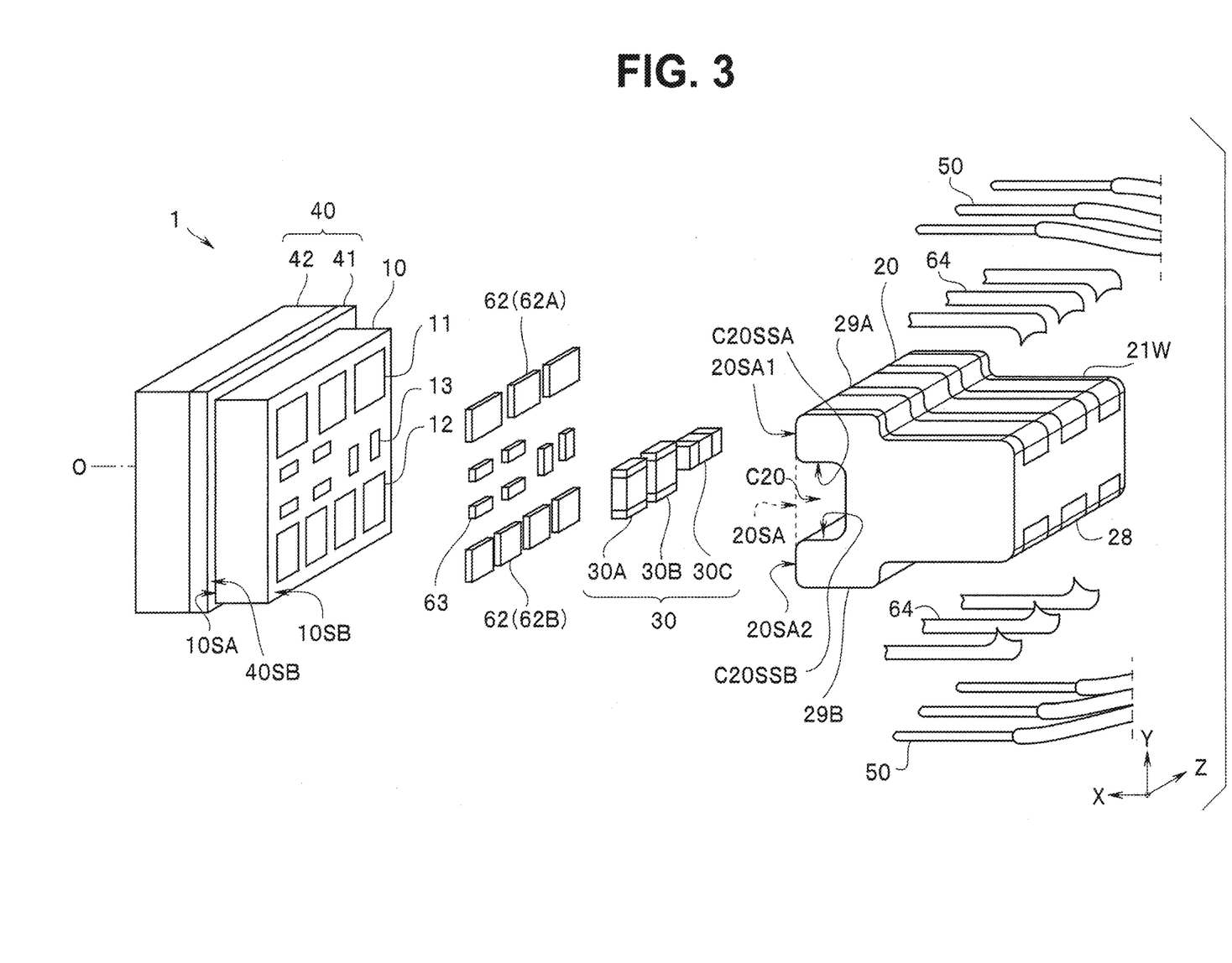
FIG. 3 is an exploded view of the image pickup unit of the first embodiment.

The semiconductor package 40 includes an imager (image sensor) 41 and a cover glass 42 adhesively bonded to a light receiving surface of the imager 41. The imager 41 is a CCD, a CMOS, or the like that converts an object image into an image pickup signal. The semiconductor package 40 is a CSP (chip size package), which is produced such that a glass wafer is adhesively bonded to a semiconductor wafer in which the plurality of imagers 41 are formed and then dicing is performed. The size of the semiconductor package 40 is, for example, 1 mm square to 3 mm square. In the semiconductor package 40, a semiconductor chip that processes an image pickup signal may be further bonded to a back surface of the imager 41.

The flat wiring board 10 includes a front surface 10SA and a first surface 10SB on a side opposite to the front surface 10SA. The flat wiring board 10 is, for example, a multi-layer wiring board in which wiring is formed in each of a plurality of wiring layers. A plurality of front surface pads (not shown) on the front surface 10SA are bonded, using solder 61, respectively to the plurality of external terminals (not shown) on a rear surface 40SB of the semiconductor package 40 (imager 41).

Figure 4:
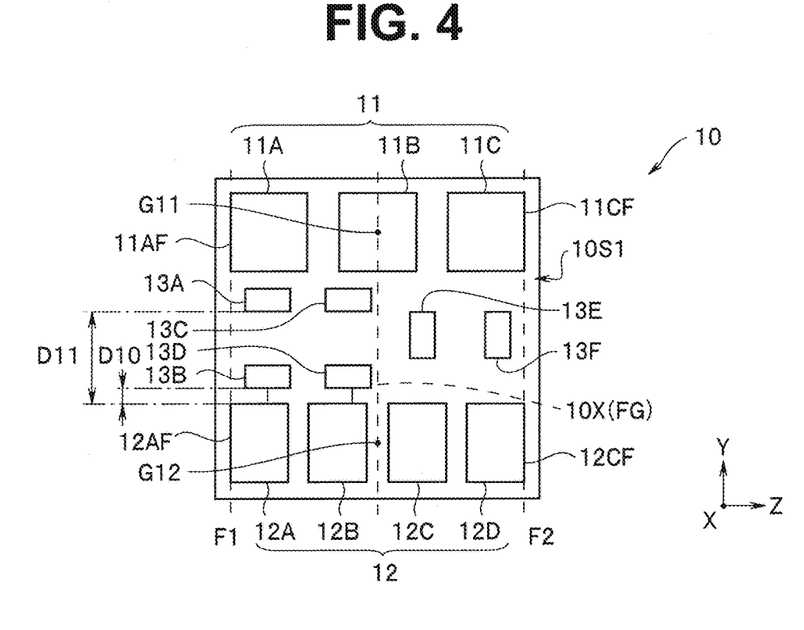
FIG. 4 is a plan view of a flat wiring board of the image pickup unit of the first embodiment.

A plurality of first pads 11 (11A-11C) and a plurality of second pads 12 (12A-12D) are disposed on the first surface 10SB. A plurality of third pads 13 (13A-13F) are disposed between the plurality of first pads 11 and the plurality of second pads 12.

Note that in the present specification, "pad" and "land" are both "electrode" having a conductor pattern for solder bonding. In other words, "pad," "land,"and "electrode" are components having the same function, but different names are used for convenience of explanation. Note that the shape of the electrode may be a quadrilateral with chamfered corners, a polygon, a round, an oval, and the like.

The electronic components 30 (30A-30C) are bonded to the third pads 13 using solder 63. Since the electronic components 30 are housed in a cutout C20 of the three-dimensional wiring board 20, the length (dimension in the optical axis direction) of the image pickup unit 1 is short. In the image pickup unit 1 in which the electronic components 30 are mounted on the flat wiring board 10 bonded to the imager 41, the distance between the imager 41 and the electronic components 30 is short. Since the wiring impedance between the imager 41 and the electronic components 30 is small, the image pickup unit 1 can obtain a high-quality image.

In the image pickup unit 1, the electronic components 30 are three chip capacitors. The type of the electronic components 30 may be an inductor, a coil, a driver IC, and the like. The number of the electronic components 30 is not limited to three, either.

Figure 5:
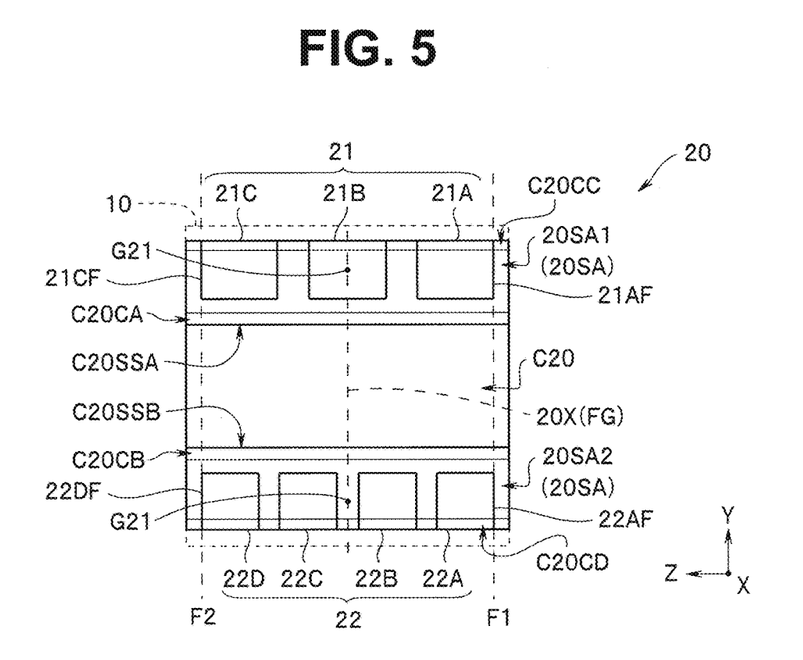
FIG. 5 is a plan view of a three-dimensional wiring board of the image pickup unit of the first embodiment.

The three-dimensional wiring board 20 is produced by injection molding and is a molded interconnect device (MID) having wiring or the like disposed on the surface. The base material of the MID is epoxy, a liquid crystal polymer, polyimide, polycarbonate, or the like. The three-dimensional wiring board 20 that is the MID can be easily manufactured in a complex shape.

The three-dimensional wiring board 20 includes a second surface 20SA arranged opposite to the first surface 10SB of the flat wiring board 10. The second surface 20SA includes the cutout C20 reaching both side surfaces. In other words, the three-dimensional wiring board 20 includes two arm portions 29 (first protrusion 29A, second protrusion 29B) projecting forward from a bottom surface (third surface). As will be described later, in the micro-image pickup unit 1, a thickness T3 of the arm portion 29 is, for example, only 0.3 mm.

The cutout C20 is between the two arm portions 29A, 29B. As shown in FIG. 3, wall surfaces C20SS (C20SSA, C20SSB) of the cutout C20 are orthogonal to the first surface 10SB.

Figure 6:
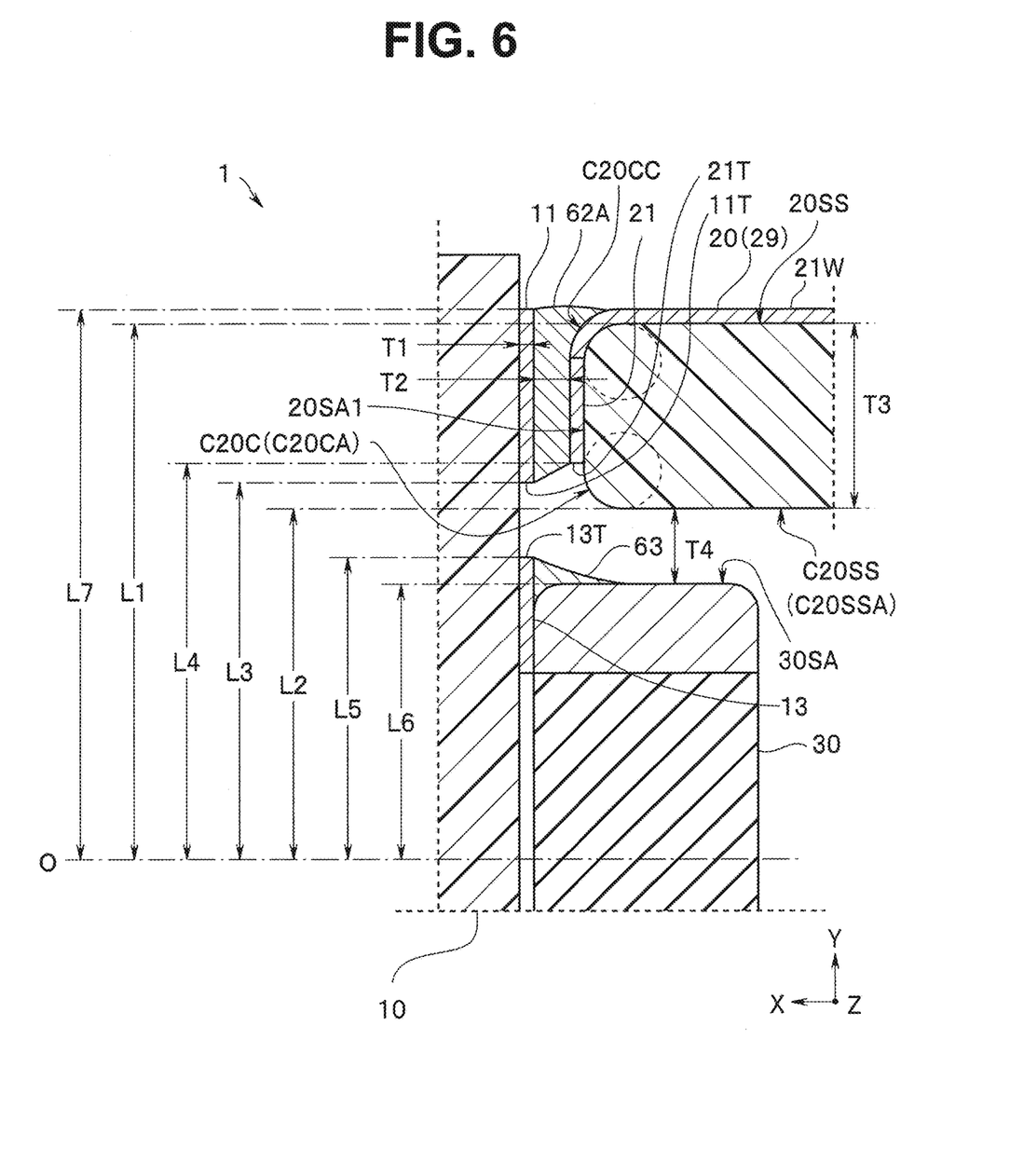
FIG. 6 is a partial cross-sectional view of the image pickup unit of the first embodiment.

The second surface 20SA is divided into a first region 20SA1 and a second region 20SA2 spaced apart from the first region 20SA1. The first region 20SA1 and the second region 20SA2 are symmetrical across a center line of the cutout C20. Note that as shown in FIG. 5 and FIG. 6, a chamfer region (transition region) C20C (C20CA) is present between the substantially rectangular first region 20SA1 and the first wall surface C20SSA of the cutout C20. A chamfer region C20CC is present between the first region 20SA1 and an upper side surface of the three-dimensional wiring board 20. A second chamfer region C20CB is also present between the second region 20SA2, which is symmetrical to the first region 20SA1, and the second wall surface C20SSB. A chamfer region C20CD is present between the second region 20SA2 and a lower side surface of the three-dimensional wiring board 20. The chamfer region C20C may be either a curved surface or a flat surface.

A plurality of first lands 21 (21A-21C) are disposed in the first region 20SA1. A plurality of second lands 22 (22A-22D) are disposed in the second region 20SA2. Note that the first lands 21 are smaller than the first pads 11 and the second lands 22 are smaller than the second pads 12.

The first lands 21 are bonded to the first pads 11 using first solder 62A. The second lands 22 are bonded to the second pads 12 using second solder 62B. As will be described later, the first solder 62A and the second solder 62B are solder 62 having the same thickness formed of a cured solder paste having the same composition, for example.

The first lands 21 of the three-dimensional wiring board 20 are extended to a proximal end side to form wiring 21W. The cable 50 is bonded to an end portion of the wiring 21W in a proximal end portion 28 of the three-dimensional wiring board 20 using solder 64. The second lands 22 are connected to wiring 22W and the cable 50 is bonded to an end portion of the wiring 22W using the solder 64. The plurality of cables 50 are bundled, on a proximal end side, to form a composite cable covered with an outer sheath shield and an outer sheath. Note that the proximal end portion 28 may be inclined relative to the second surface 20SA in a direction in which the wiring 21W and wiring 22W approach to each other.

In manufacturing the image pickup unit 1, for example, the electronic components 30 are bonded to the flat wiring board 10, the semiconductor package 40 and the flat wiring board 10 are bonded together, the flat wiring board 10 and the three-dimensional wiring board 20 are bonded together, and the cables 50 are bonded to the three-dimensional wiring board 20.

As shown in FIG. 1, the flat wiring board 10 and the three-dimensional wiring board 20 are housed in a virtual space 40S where the imager 41 is extended in the optical axis direction. In other words, the flat wiring board 10 and the three-dimensional wiring board 20 are disposed within a projection of the semiconductor package 40 in the optical axis direction. Therefore, in the image pickup unit 1, a dimension orthogonal to the optical axis O is small.

Note that the peripheries of a plurality of solder bonding portions are each sealed with a sealing resin that is not shown.

It is not easy to precisely bond the flat wiring board 10 and the three-dimensional wiring board 20 together using the solder 62. In particular, in the micro-mage pickup unit 1, movement due to the interfacial tension of the melted solder 62 could occur. If a relative position between the flat wiring board 10 and the three-dimensional wiring board 20 is displaced from a predetermined position, when an external stress is applied, the stress is concentrated in the bonding portions and thus, the bonding reliability is reduced. The melted solder 62 could be short-circuited with the solder 63 that bonds the electronic components 30 already mounted. When the second surface 20SA is not parallel to, but curves relative to the first surface 10SB, the outer dimension of the image pickup unit 1 is enlarged.

<Size and Arrangement>

To precisely bond the flat wiring board 10 and the three-dimensional wiring board 20 together using the solder 62 with the self-arrangement effect as well as to prevent the movement due to the interfacial tension of the melted solder 62, the size and arrangement of each of the plurality of electrodes (pads and lands) are important.

In the image pickup unit 1, the size of the first pad 11 is, for example, 0.16 mm×0.25 mm. The size of the second pad 12 is, for example, 0.11 mm×0.25 mm. A first pad number (first number) N1 of the plurality of first pads 11 is "3" and a second pad number (second number) N2 of the plurality of second pads 12 is "4." In other words, the first pad number N1 and the second pad number N2 are different. However, the sum of the areas of the plurality of first pads 11 (S11=0.12 mm$^2$) and the sum of the areas of the plurality of second pads 12 (S12=0.11 mm$^2$) are substantially the same.

The plurality of first pads 11 and the plurality of second pads 12 of the flat wiring board 10 of the image pickup unit 1 are arranged in regions that are symmetrical across the cutout C20. The interfacial tension of the melted solder 62 is substantially proportional to the bonding area. The interfacial tension of the melted first solder 62A and the interfacial tension of the melted second solder 62B are substantially the same.

Note that in the present specification, "a value A and a value B are substantially the same" means that the value A is above 85% and below 115% (including 100%) of the value B.

As long as the first area S11 and the second area S12 are substantially the same, at least either the plurality of first pads 11 or the plurality of second pads 12 may include a plurality of pads having different areas.

Further, in the image pickup unit 1, the size of the first land 21 is, for example, 0.16 mm×0.16 mm. The size of the second land 22 is, for example, 0.11 mm×0.16 mm. In other words, the first land 21 and the second land 22 are smaller than the first pad 11 and the second pad 12. A first land number of the first lands 21 is the same as the first pad number N1. A second land number of the second lands 22 is the same as the second pad number N2.

The number N1 of the plurality of first lands 21 and the number N2 of the plurality of second lands 22 are different. However, the sum of the areas of the plurality of first lands 21 (S21=0.0768 mm$^2$) and the sum of the areas of the plurality of second lands 22 (S22=0.0704 mm$^2$) are substantially the same.

Even when affected by the solder 62 spreading over the first pads 11 and the second pads 12, the interfacial tension of the solder 62 melted in bonding acts symmetrically across the cutout C20. Therefore, the flat wiring board 10 and the three-dimensional wiring board 20 are precisely bonded together using the solder 62.

A first distance between the first pad 11 and the first land 21 and a second distance between the second pad 12 and the second land 22 are substantially the same. In other words, a thickness T62A of the first solder 62A that bonds the first pad 11 and the first land 21 together and a thickness T62B of the second solder 62B that bonds the second pad 12 and the second land 22 together are the same thickness T2 (see FIG. 6). The thickness T2 of the solder 62 is, for example, 20 μm to 30 μm. Note that a thickness T1 (see FIG. 6) of the electrode (pad, land) is, for example, 5 μm to 10 μm.

Therefore, a volume V62A (S21×T62) as the sum of the volumes of the plurality of pieces of first solder 62A and a volume V62B (S22×T62) as the sum of the volumes of the plurality of pieces of second solder 62B are substantially the same. The plurality of pieces of first solder 62A each bond respectively the plurality of first pads 11 and the plurality of first lands 21 together. The plurality of pieces of second solder 62B each bond respectively the plurality of second pads 12 and the plurality of second lands 22 together.

Note that it goes without saying that the first pad number N1 of the plurality of first pads and the second pad number N2 of the plurality of second pads may be the same.

It is preferable that the interfacial tension of the solder 62 melted in bonding should also act symmetrically in a direction (left-right direction in FIG. 2: Z-axis direction) orthogonal to the cutout C20. As virtually viewed in a direction orthogonal to the optical axis O, that is, on a YZ-plane (FIG. 4 and FIG. 5), it is preferable that the interfacial tension of the melted solder 62 should act respectively symmetrically about center axes 10X, 20X in the left-right direction of the first surface 10SB and the second surface 20SA.

To this end, further, the center axis 10X of the flat wiring board 10 and the center axis 20X of the three-dimensional wiring board 20 are positioned on the same plane. Furthermore, it is preferable that outer side end surfaces of the plurality of electrodes that are positioned on and bonded to respective outer sides of the plurality of first pads 11, the plurality of second pads 12, the plurality of first lands 21, and the plurality of second lands 22 should be positioned on the same plane.

In other words, an outer side end surface 11AF of the first pad 11A, an outer side end surface 12AF of the second pad 12A, an outer side end surface 21AF of the first land 21A, and an outer side end surface 22AF of the second land 22A are positioned on a plane F1. Further, an outer side end surface 11CF of the first pad 11C, an outer side end surface 12CF of the second pad 12D, an outer side end surface 21CF of the second land 21C, and an outer side end surface 22DF of the second land 22D are positioned on a plane F2.

In addition, it is preferable that the points of gravity G11, G12, G21, and G22 of the respective groups of the electrodes of the plurality of first pads 11, the plurality of second pads 12, the plurality of first lands 21, and the plurality of second lands 22 should be positioned on the same plane FG. The plane FG includes the center axis 10X and the center axis 20X.

The image pickup unit 1 can prevent an unintentional movement of the three-dimensional wiring board 20 due to the interfacial tension of the melted solder 62. Further, even when the flat wiring board 10 and the three-dimensional wiring board 20 are not arranged in correct positions prior to bonding, the three-dimensional wiring board 20 can be moved to the correct position to be bonded using the self-alignment effect due to the interfacial tension of the melted solder 62.

<Position of Land Inner Side End>

As already described, the thickness T3 of the arm portion 29 of the three-dimensional wiring board 20 is 0.3 mm. The lower limit of the thickness T3 is, for example, 0.2 mm. When the lower limit of the thickness T3 is below the aforementioned lower limit, the mechanical strength cannot be secured, and in addition, injection molding is difficult. The upper limit of the thickness T3 is, for example, below 1 mm for size reduction. Note that the thickness T3 of the arm portion 29 is a difference between a first distance L1 from an outer side surface 20SS of the three-dimensional wiring board 20 to the optical axis O and a second distance L2 from the wall surfaces C20SSA and C20SSB of the cutout C20 that are respectively adjacent to the plurality of first pads 11 and the plurality of second pads 12 to the optical axis (FIG. 6). In other words, in the image pickup unit 1, the difference between the first distance L1 and the second distance L2 is above 0.2 mm and below 1 mm.

For bonding reliability, it is preferable that a land inner side end 21T of the first land 21 should be extended to the wall surface C20SS (C20SSA) of the cutout C20. However, in the micro-image pickup unit 1, when the land inner side end 21T of the first land 21 is extended, the solder 62 could be short-circuited with the solder 63.

When the thickness T3 of the arm portion 29 is made thinner, even if the first land 21 is extended to the first chamfer region C20CA or the first wall surface C20SSA of the cutout C20, there is no possibility that the solder 62 could be short-circuited with the solder 63. However, when the thickness T3 is made thinner, the mechanical strength cannot be secured, and in addition, injection molding is difficult. In the image pickup unit 1 in which the thickness T3 cannot be made thinner to less than a predetermined value, the size of the first land 21 and the size of the second land 22 are limited.

For example, as shown in FIG. 6, the land inner side end 21T of the first land 21 is not extended to the wall surface C20SS (first wall surface C20SSA) of the cutout C20. The first wall surface C20SSA is the wall surface C20SS adjacent to the first pad 11. More preferably, the land inner side end 21T of the first land 21 is not extended to the chamfer region C20C (first chamfer region C20CA), as in the image pickup unit 1. Similarly, though not shown, the second land 22 is not extended to the wall surface C20SS (second wall surface C20SSB) of the cutout C20. The second wall surface C20SSB is the wall surface C20SS adjacent to the second pad 12. More preferably, the second land 22 is not extended to the chamfer region C20C (second chamfer region C20CB).

<Positional Relation of Bonding Portion>

In the micro-image pickup unit 1, it is necessary to prevent the melted solder 62 from being short-circuited with the bonding portion (third pad 13, solder 63) of the mounted electronic components 30 while securing the mechanical strength. Therefore, the positional relations of the plurality of bonding portions among the flat wiring board 10, the three-dimensional wiring board 20, and electronic components 30 are important.

Regarding the positional relations of the plurality of bonding portions, a portion including the first region 20SA1 and a portion including the second region 20SA2 are symmetrical across the optical axis O. Therefore, hereinafter, an upper portion including the first region 20SA1 shown in FIG. 6 will be described as an example. FIG. 6 is a partial cross-sectional view of a cross-section orthogonal to the optical axis O of the image pickup unit 1 and parallel to the wall surface C20SS of the cutout C20.

As shown in FIG. 6, a third distance L3 is preferably between the second distance L2 and a fourth distance LA. The third distance L3 is a distance of a pad inner side end 11T of the first pad 11 from the optical axis O. The second distance L2 is a distance of the first wall surface C20SSA adjacent to the first pad 11 from the optical axis O. The fourth distance LA is a distance of the land inner side end 21T of the first land 21 from the optical axis O.

In other words, when the third distance L3 is greater than the second distance L2, a short circuit could occur between the solder 62 and the solder 63. When the fourth distance LA is set smaller than the third distance L3, since the area of the bonding portion is reduced, the bonding reliability is reduced.

Similarly, a distance (the same as the third distance L3) of a pad inner side end of the second pad 12 from the optical axis O is preferably between a distance (the same as the second distance L2) of the second wall surface C20SSB, which is the wall surface C20SS adjacent to the second pad 12, from the optical axis O and a distance (the same as the fourth distance LA) of a land inner side end (not shown) of the second land 22 from the optical axis O.

Further, a fifth distance L5 of a pad outer side end 13T of the third pad 13 from the optical axis O is preferably shorter than the second distance L2. According to the aforementioned configuration, the short circuit between the solder 62 and the solder 63 can be prevented.

Figure 7A:
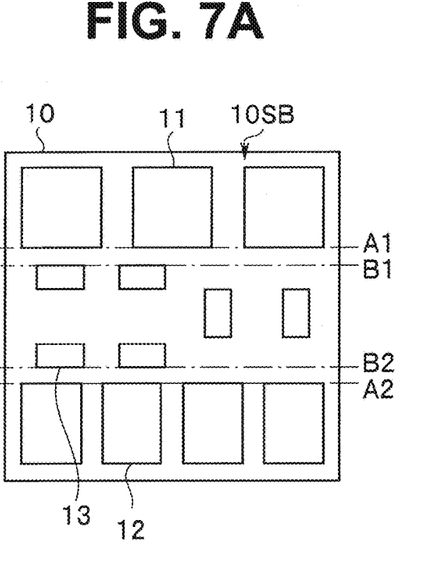
FIG. 7A is a plan view of the flat wiring board of the image pickup unit of the first embodiment.

The aforementioned configuration will be further described with reference to the plan views shown in FIG. 7A and FIG. 7B. As shown in FIG. 7A, of ridge lines formed by the plurality of first pads 11, a ridge line on an inner side is set to be a ridge line A1 and of ridge lines formed by the plurality of second pads 12, a ridge line on an inner side is set to be a ridge line A2. Of ridge lines formed by the plurality of third pads 13, a ridge line closest to the first pads 11 is set to be a ridge line B1 and a ridge line closest to the second pads 12 is set to be a ridge line B2.

Figure 7B:
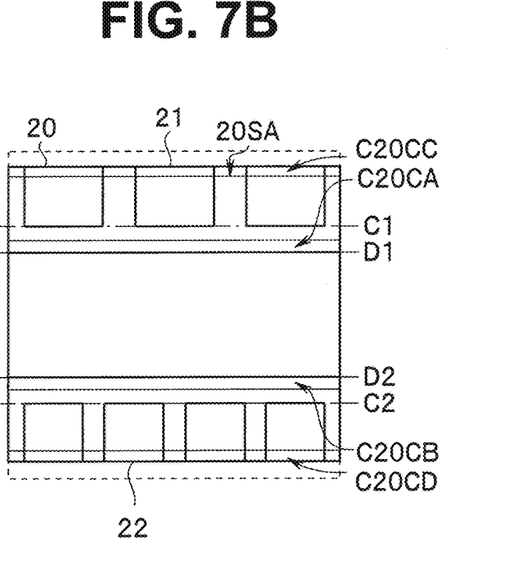
FIG. 7B is a plan view of the three-dimensional wiring board of the image pickup unit of the first embodiment.

As shown in FIG. 7B, of ridge lines formed by the plurality of first lands 21, a ridge line on an inner side is set to be a ridge line C1 and of ridge lines formed by the plurality of second lands 22, a ridge line on an inner side is set to be a ridge line C2. A ridge line of the first wall surface C20SSA that is the wall surface C20SS adjacent to the first lands 21 is set to be a ridge line D1, and a ridge line of the second wall surface C20SSB that is the wall surface C20SS adjacent to the second lands 22 is set to be a ridge line D2.

It is preferable that the ridge line A1 should be positioned between the ridge line C1 and the ridge line D1 and the ridge line A2 should be positioned between the ridge line C2 and the ridge line D2.

It is preferable that the ridge line B1 should be positioned on an inner side (optical axis side) relative to the ridge line D1 and the ridge line B2 should be positioned on an inner side (optical axis side) relative to the ridge line D2.

Note that a sixth distance L6 of a surface 30SA on an outermost side of the plurality of electronic components 30 from the optical axis O is preferably shorter than the second distance L2. According to the aforementioned configuration, the electronic components 30 can be easily housed in the cutout C20. Further, the plurality of first pads 11 (11A-11C), the plurality of second pads 12 (12A-12D), and the plurality of third pads 13 (13A-13F) on the flat wiring board 10 can be prevented from contacting each other. The pieces of solder applied to the pads can be prevented from contacting each other.

Note that when the bonding portion forms a fillet, the bonding reliability improves. Therefore, a seventh distance L7 of a pad outer side end of each of the plurality of first pads 11 and the plurality of second pads 12 from the optical axis O is preferably longer than the first distance L1 between the outer side surface 20SS of the three-dimensional wiring board 20 and the optical axis O. Further, the fifth distance L5 of the pad outer side end 13T of the plurality of third pads 13 from the optical axis O is preferably longer than the sixth distance L6 of the surface 30SA on the outermost side of the plurality of electronic components 30 from the optical axis O.

<Type of Pad and Land>

An area S5 as the sum of the areas of a plurality of ground pads that are grounded of the plurality of first pads 11, the plurality of second pads 12, and the plurality of third pads 13 is preferably greater than the area of a non-ground pad with the largest area of the plurality of non-ground pads that are not grounded.

For example, the first pad 11A and the second pad 12D are ground pads. The first pads 11B, 11C are non-ground pads connected to a power source. The second pads 12A, 12B, 12C are non-ground pads where a signal flows. The area S5 (0.0675 mm$^2$), which is the sum of the areas of the plurality of ground pads, is greater than the area (0.04 mm$^2$) of the first pad 11B with the largest area of the non-ground pads.

According to the aforementioned configuration, deterioration of the electric property of the image pickup unit 1 due to an increase in the impedance can be prevented.

Further, of the plurality of second pads 12 and the plurality of third pads 13, a connecting pad distance between the second pad 12 and the third pad 13 that are directly connected on an inner layer of the flat wiring board 10 is preferably shorter than a distance between the second pad 12 and the third pad 13 that are not directly connected on the inner layer of the wiring board.

For example, the second pad 12A and the third pad 13B are a second connecting pad and a third connecting pad that are directly connected. The second pad 12A and the third pad 13A are a second non-connecting pad and a third non-connecting pad that are not directly connected. A connecting pad distance D10 between the second pad 12A and the third pad 13B is shorter than a non-connecting pad distance D11 between the second pad 12A and the third pad 13A.

According to the aforementioned configuration, since the wiring of the flat wiring board 10 is short, the image pickup unit 1 can obtain excellent electric property.

Second Embodiment

Figure 8:
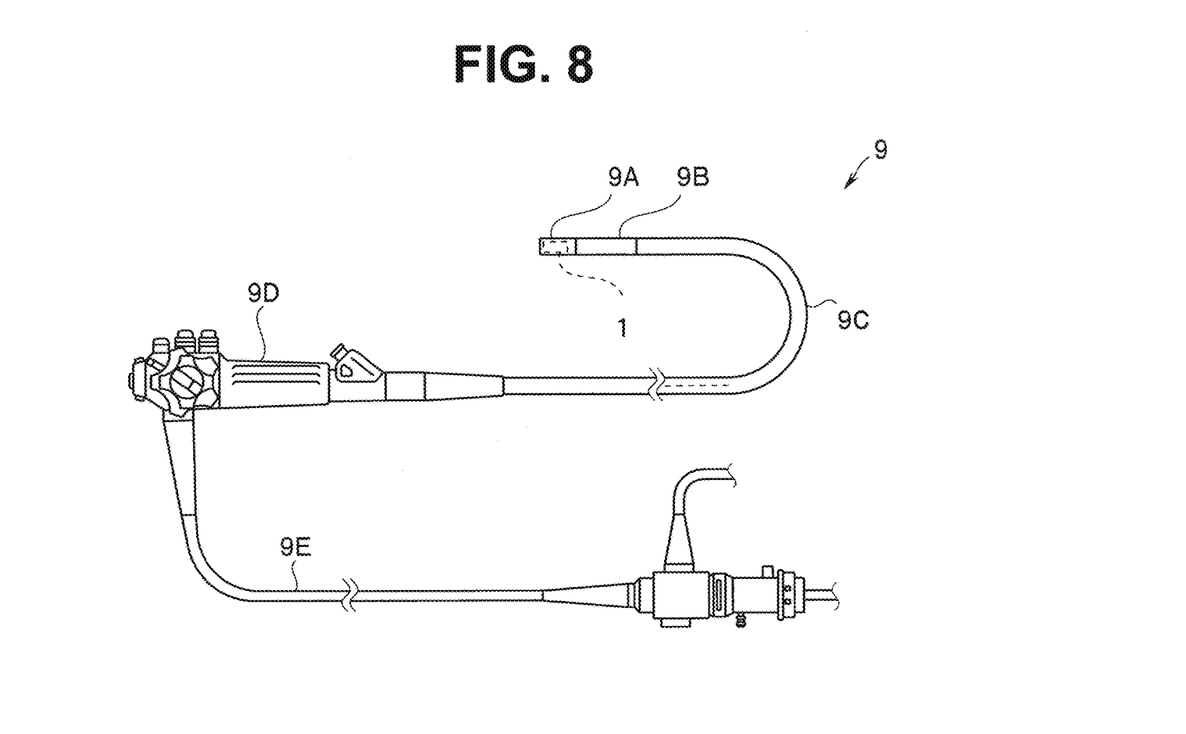
FIG. 8 is a perspective view of an endoscope of a second embodiment.

As shown in FIG. 8, an endoscope 9 of the present embodiment includes a distal end portion 9A in which the image pickup unit 1 is disposed, a freely bendable bending portion 9B continuously provided at a proximal end of the distal end portion 9A, and an elongated flexible portion 9C continuously provided at a proximal end of the bending portion 9B. The bending portion 9B is bent by a user operating an operation portion 9D. The distal end portion 9A, the bending portion 9B, and the flexible portion 9C are an insertion portion that is inserted into a body. A universal cord 9E extending from the operation portion 9D is connected to a processor (not shown) or the like.

The endoscope 9 includes the image pickup unit 1 and is thus highly reliable and has a high performance.

Note that the endoscope 9 is a flexible endoscope for medical use, but the endoscope of another embodiment may be an endoscope for industrial use, or a rigid endoscope including a rigid straight tube in place of the flexible portion 9C. Further, the image pickup unit 1 may be used for a front-view type endoscope in which a direction toward a subject is a direction toward a distal end.

The three-dimensional wiring board 20 is not limited to the molded interconnect device (MID). For example, the three-dimensional wiring board 20 may be produced by processing using a 3D printer or cutting processing. The material of the three-dimensional wiring board 20 is not limited to resin, but may adopt ceramics or glass epoxy.

The present disclosure is not limited to the aforementioned embodiments and the like, and various changes, modifications, and the like can be made within the scope without changing the gist of the present invention.

What is claimed is:

1. An image pickup unit for use with an endoscope, the image pickup unit comprising:
   a first wiring board comprising:
      a first surface;
      a plurality of first pads disposed on the first surface; and
      a plurality of second pads disposed on the first surface; and
   a second wiring board comprising:
      a second surface comprising a first region and a second region spaced apart from the first region;
      a plurality of first lands disposed on the first region, the plurality of first lands solder-bonded to the plurality of first pads; and
      a plurality of second lands disposed on the second region, the plurality of second lands solder-bonded to the plurality of second pads;
   wherein a sum of areas of the plurality of first pads is substantially same as a sum of areas of the plurality of second pads, and
   a sum of volumes of a plurality of first solder bonding each of the plurality of first pads and each respective first land of the plurality of first lands is substantially same as a sum of volumes of a plurality of second solder bonding each of the plurality of second pads and each respective second land of the plurality of second lands.

2. The image pickup unit according to claim 1, wherein a first number of the plurality of first pads is different from a second number of the plurality of second pads.

3. An image pickup unit for use with an endoscope, the image pickup unit comprising:
   a first wiring board comprising:
      a first surface;
      a plurality of first pads disposed on the first surface; and
      a plurality of second pads disposed on the first surface; and
   a second wiring board comprising:
      a second surface comprising a first region and a second region spaced apart from the first region;
      a plurality of first lands disposed on the first region, the plurality of first lands solder-bonded to the plurality of first pads; and
      a plurality of second lands disposed on the second region, the plurality of second lands solder-bonded to the plurality of second pads;
   wherein a sum of areas of the plurality of first pads is substantially same as a sum of areas of the plurality of second pads,
   the second wiring board comprises:
   a third surface;
   a first protrusion protruding from the third surface, the first protrusion including the first region; and
   a second protrusion protruding from the third surface, the second protrusion including the second region,
   a cutout is located between the first protrusion and the second protrusion,
   the first wiring board further comprises:
      a plurality of third pads disposed on the first surface, the plurality of third pads disposed between the plurality of first pads and the plurality of second pads; and
      a plurality of electronic components solder-bonded to the plurality of third pads, and
      the plurality of electronic components are located in the cutout.

4. The image pickup unit according to claim 1, wherein a first distance between the plurality of first pads and the plurality of first lands is substantially same as a second distance between the plurality of second pads and the plurality of second lands.

5. The image pickup unit according to claim 1, wherein each of outer side end surfaces of a plurality of electrodes positioned on respective outer sides of the plurality of first pads, the plurality of second pads, the plurality of first lands, and the plurality of second lands are positioned on a same plane.

6. An image pickup unit for use with an endoscope, the image pickup unit comprising:
 a first wiring board comprising:
  a first surface;
  a plurality of first pads disposed on the first surface; and
  a plurality of second pads disposed on the first surface; and
 a second wiring board comprising:
  a second surface comprising a first region and a second region spaced apart from the first region;
  a plurality of first lands disposed on the first region, the plurality of first lands solder-bonded to the plurality of first pads; and
  a plurality of second lands disposed on the second region, the plurality of second lands solder-bonded to the plurality of second pads;
 wherein a sum of areas of the plurality of first pads is substantially same as a sum of areas of the plurality of second pads, and
 a center of gravity of the plurality of first pads, the plurality of second pads, the plurality of first lands, and the plurality of second lands are respectively positioned on a same plane.

7. The image pickup unit according to claim 3, further comprising an image sensor,
 wherein a difference between a first distance and a second distance is between 0.2 mm and 1 mm, the first distance is from an outer side surface of the second wiring board to an optical axis of the image sensor, the second distance is from wall surfaces of the cutout respectively adjacent to the plurality of first pads and the plurality of second pads to the optical axis.

8. The image pickup unit according to claim 7, wherein the plurality of first lands are not extended to a first transition region between the first region and a first wall surface of the cutout adjacent to the plurality of first pads, and
 the plurality of second lands are not extended to a second transition region between the second region and a second wall surface of the cutout adjacent to the plurality of second pads.

9. The image pickup unit according to claim 3, further comprising an image sensor,
 wherein in a cross-section orthogonal to an optical axis of the image sensor and parallel to wall surfaces of the cutout respectively adjacent to the plurality of first pads and the plurality of second pads, a third distance of a pad inner side end of each of the plurality of first pads and the plurality of second pads from the optical axis is between a second distance and a fourth distance, the second distance being of the wall surfaces of the cutout respectively adjacent to the plurality of first pads and the plurality of second pads from the optical axis, the fourth distance being of a land inner side end of each of the plurality of first lands and the plurality of second lands from the optical axis.

10. The image pickup unit according to claim 9, wherein a fifth distance of a pad outer side end of each of the plurality of third pads from the optical axis is shorter than the second distance.

11. The image pickup unit according to claim 10, wherein a sixth distance of a surface on an outermost side of the plurality of electronic components from the optical axis is shorter than the second distance.

12. The image pickup unit according to claim 3, wherein a sum of areas of a plurality of ground pads grounded of the plurality of first pads, the plurality of second pads, and the plurality of third pads is greater than an area of a non-ground pad with a largest area of a plurality of non-ground pads not grounded.

13. The image pickup unit according to claim 1, wherein a connecting pad distance between a second pad of the plurality of second pads and a third pad of the plurality of third pads directly connected on an inner layer of the first wiring board is shorter than a non-connecting pad distance between another second pad of the plurality of second pads and another third pad of the plurality of third pads not directly connected.

14. A semiconductor package comprising:
 the image pickup unit according to claim 1, and
 an image sensor,
  wherein the first wiring board and the second wiring board are disposed within a projection of the semiconductor package in an optical axis direction.

15. An endoscope comprising
 an insertion portion configured to be inserted into a body; and
 the image pickup unit according to claim 1 disposed in a distal end portion of the insertion portion.

16. A semiconductor package comprising:
 the image pickup unit according to claim 3, and
 an image sensor,
  wherein the first wiring board and the second wiring board are disposed within a projection of the semiconductor package in an optical axis direction.

17. An endoscope comprising:
 an insertion portion configured to be inserted into a body; and
 the image pickup unit according to claim 3 disposed in a distal end portion of the insertion portion.

18. A semiconductor package comprising:
 the image pickup unit according to claim 9, and
 an image sensor,
  wherein the first wiring board and the second wiring board are disposed within a projection of the semiconductor package in an optical axis direction.

19. An endoscope comprising:
 an insertion portion configured to be inserted into a body; and
 the image pickup unit according to claim 6 disposed in a distal end portion of the insertion portion.

* * * * *